Figure 1:
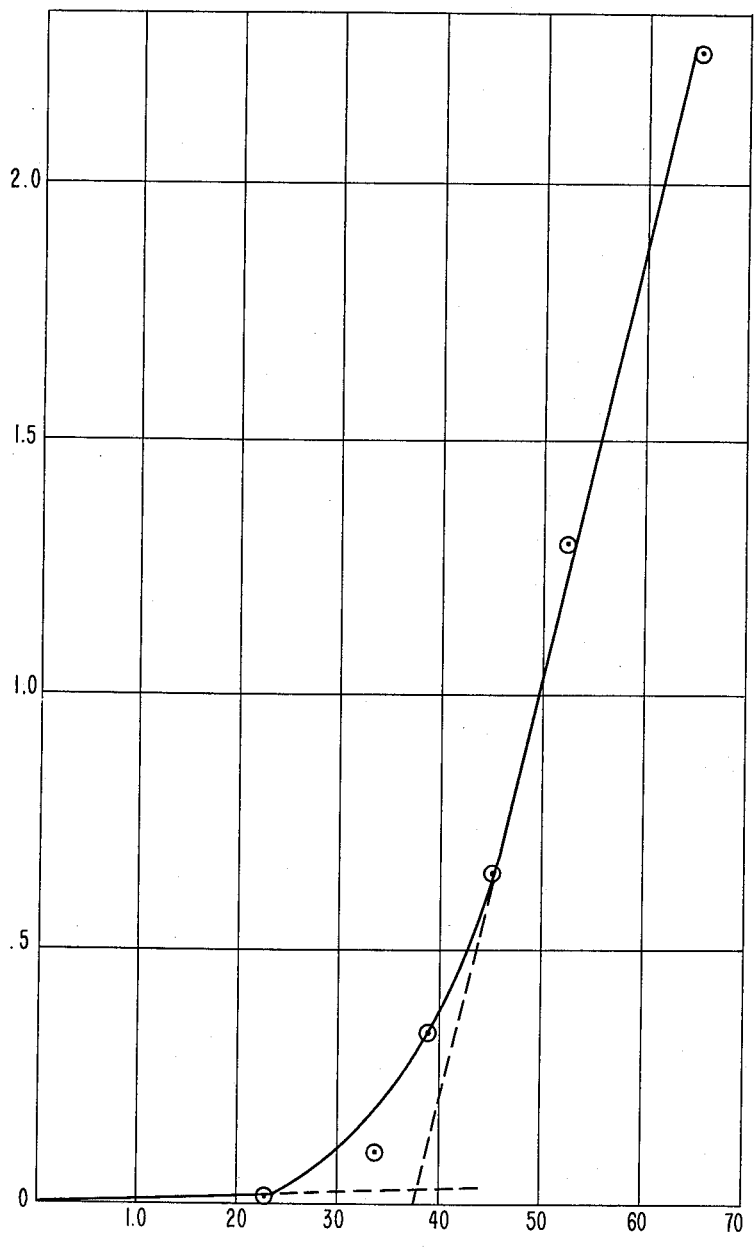

April 2, 1963

V. E. SHASHOUA 3,084,132

PROCESS FOR FORMING A STABLE DISTRIBUTION OF SILVER HALIDE

Filed June 25, 1958

INVENTOR
VICTOR E. SHASHOUA

BY Carl A. Hechmer

ATTORNEY 3,084,132
PROCESS FOR FORMING A STABLE DISTRIBUTION OF SILVER HALIDE
Victor E. Shashoua, Wilmington, Del., assignor to E. I. du Pont de Nemours and Company, Wilmington, Del., a corporation of Delaware
Filed June 25, 1958, Ser. No. 744,522
1 Claim. (Cl. 260—29.6)

This invention relates to a novel and useful composition of matter. More particularly, it relates to a process for the preparation of a stable distribution of a solid in a liquid.

All manner of solid products, such as pigments, metals, insecticides, fungicides, photosensitive compounds, lubricating oil additives, gasoline additives, and the like, to be used in a liquid media which is not a solvent for such solids, present the problem of making dispersions that are stable to normal storage conditions. Also, the use of solid compounds in heterogenous phase chemical reactions presents a problem of making good suspensions with a surface area/volume ratio of the solid that is favorable to a rapid reaction. The use of very fine grinding as by a colloid mill in conjunction with the use of dispersing agents and thickeners and other techniques of colloid chemistry have been the only expedients useful in such problems. However, these techniques are extremely expensive and with many products they are impractical because of the chemical deterioration of the product and the like.

It is an object of the present invention to provide a novel and useful process for forming a stable distribution of a solid in a liquid medium.

Another object is the preparation of a stable distribution of a metallic compound in a liquid.

A further object is the preparation of a new and useful form of a solid catalyst.

These and other objects will become apparent in the course of the following specification and claim.

In accordance with the present invention, there is provided a process for forming a stable distribution, in an extending medium, of a chemical entity from the class consisting of an acid, a base and a coordinating substance which comprises associating the said chemical entity with a complementary microgel, the said microgel being in a microsol at a concentration no greater than its gel point. The association of the chemical entity with the microgel may result in the formation of a novel chemical compound or a coordinated complex. Where a compound is formed, there may be an "insoluble by-product" deposited upon the microgel, such as by simple metathesis. Also, after association of the chemical entity with the microgel, the associated entity may thereafter be reacted with later added reactants to form solid "by-products" on the microgel particles. The process is particularly useful in obtaining uniform dispersion of metals, metal oxides, metal sulfates, insoluble metallic salts. It is also useful in controlling dialysis rates of certain compounds as will be demonstrated hereinafter.

A brief consideration of polymer structure theory will assist in an understanding of the concepts "microgel" and "microsol" used above. The prevailing theory of polymer structure admits of two extreme forms definable by solubility characteristics. This theory attributes to those polymers exhibiting high solubility a linear or branched structure. Insoluble polymers are assumed to be of a highly cross-linked nature. The transition from the soluble to the insoluble form proceeds gradually in a direct relation to the degree of cross-linking. As solubility decreases, characteristic swellability is observed. Swellability diminishes as cross-linking is increased. The art denotes the insoluble form as cross-linked. The recognition of the liquids in which a particular cross-linked polymer is swellable will be obvious to those skilled in the art. In general, where the product is formed from a linear polymer by cross-linking, it is swellable in those liquids in which such linear component exhibits solubility. Where no identifiable linear counterpart exists, swellability follows analogously the recognized laws applicable to the solubility of linear polymers. Such relationships are discussed in detail in "Solubility of Non-Electrolytes," by Joel H. Hildebrand (Reinhold Publishing Corp., N.Y., N.Y., 1936), "Industrial Solvents," by Ibert Mellan (Reinhold Publishing Corp., N.Y., N.Y., 1939), and "Vinyl and Related Polymers," by C. E. Schildknecht (John Wiley and Sons, N.Y., 1952).

A "microgel" is the swollen form of a "d-microgel" which in turn is a unimolecular colloidal particle of a cross-linked polymer having on the average a diameter no greater than about 3 microns (and preferably no smaller than about 0.005 micron) cross-linked to such an extent that it forms a "microsol," as defined hereinafter, when extended in liquids in which it is swellable, and exhibits therein a characteristic defined as a "gel point" which will be described in detail hereinafter. Thus, since the d-microgel particle is a cross-linked polymer, it is swellable in certain liquids, but does not dissolve therein in the accepted sense of the term. Because of its particle size limitations, it possesses unique properties when extended in a medium in which it is swellable, the swollen particle being designated a "microgel." When a microgel is distributed in an extending medium, the product is a "microsol."

A microsol partakes of some of the properties of both true dispersions and true solutions. The particles exhibit Brownian motion. The microsols do not follow Staudinger's law, which relates viscosity to molecular weight. Microsol viscosities have been observed to have no relation whatever to the molecular weight of the microgel or the d-microgel. On evaporation of the extending medium, the d-microgel particle, in its original discrete form, is recovered. The microsols possess a "gel point," i.e., a concentration of a given microgel particle in a given extending medium at which the extending medium is absorbed by the microgel particles. Below the gel point, the microgel particles have no appreciable effect upon the viscosity of the extending medium. At and above the gel point, a sharp increase in viscosity with increase in microgel concentration is observed. The gel point will vary for any particular system, but it can be readily determined empirically by plotting the percent concentration by weight of d-microgel against the viscosity of the microsol. Such a curve is essentially linear and of relatively little slope below the gel point. At the gel point, a sharp break occurs in the curve and it rises rapidly. The gel point can be calculated assuming that it represents the condition where there is a hexagonal close packing of the spheres of the swollen microgels, the gel point (G) in percent by weight as previously defined can be calculated as follows:

$$G = \left(3\frac{\pi}{\sqrt{2}}\right)\left(\frac{P}{S}\right)100 = \frac{74.1P}{S}$$

where P is the density of the dry particle and S is the swelling factor (ratio of swollen-to-dry particle volumes). Alternatively, a modification of Einstein's equation for the viscosity of spherical particles can be used to calculate G.

$$[n] = \frac{0.025}{P}S$$

where $n$ represents intrinsic viscosity of the microsol $$G = \frac{74.1P(0.025)}{[n]P} = \frac{1.85}{[n]}$$

The concepts discussed above are presented and demonstrated in United States application No. 372,673, filed August 6, 1953, now United States Patent No. 2,908,659, dated October 13, 1959.

The invention will be more readily understood by reference to the illustrations.

FIGURE 1 is a curve wherein the viscosity in poises of the microsol of Example I is plotted as ordinate against microgel concentration as abscissa, the gel point appearing on the curve at the break.

The following examples are cited to illustrate the invention. They are not intended to limit it in any manner. In the examples, the expression "intrinsic viscosity" with the symbol $(n)$ signifies the value of $\ln (n)_r$ at the ordinate axis intercept (i.e., when $c$ equals 0) in a graph of $$\frac{\ln (n)_r}{c}$$

as ordinate with $c$ values (grams per 100 ml. of solution) as abscissas. $(n)_r$ is a symbol for relative viscosity, which is the ratio of the flow times in a viscosimeter of a polymer solution and the solvent. ln is the logarithm to the base $e$. All measurements on microgels are made with 0.25% aqueous NaCl solutions at 25° C.

*Example I*

This example illustrates in detail the process used in microgel preparation. It also illustrates basic concepts such as "gel point."

Sixty-four grams of freshly distilled dimethylaminoethyl methacrylate in 10.0 grams of N,N'-methylene bis-acrylamide is diluted with distilled water to obtain a clear solution (a total volume of 200 ml.). Half the above monomer mixture is added dropwise over a period of 30 minutes to a solution of 12 grams of sodium lauryl sulfate in 1 liter of distilled water containing .2 gram of potassium persulfate and .2 gram of sodium bisulfite in a 3-liter flask equipped with a stirrer and immersed in a thermostat at 40° C. After polymerizing for 12 hours at 40° C. with stirring and under a blanket of nitrogen, the remaining half of the monomer is added dropwise over a 30-minute period and the polymerization is allowed to proceed for another 12 hours. A clear, aqueous dispersion with a faint blue opalescence is obtained containing 2.9% solids (a yield of 45%) having an $[n]$ of 0.06.

Portions of the above product are concentrated under vacuum to prepare different samples in distilled water. The viscosity of each solution is determined at 25° C. in a Gardner bubble viscosimeter, and the concentrations (weight percent) plotted against the viscosity in poises as shown in FIGURE 1. The sharp break in the curve at a concentration of 38% is the gel point for this system. Using the formulae presented previously, the calculated gel point is 31%.

The microsol obtained above is passed through a column containing a strongly basic ion exchange resin prepared by the amination with trimethylamine of a chloromethylated styrenedivinylbenzene copolymer (United States Patent 2,591,573). The column effluent contains no sulfur by analysis indicating that all of the soap has been removed. The resulting dispersion is then placed in a "non-moisture proofed" cellophane bag and dialyzed against distilled water to remove the sodium hydroxide produced during the ion exchange procedure.

When the polymerization described above is modified by use of only 8 grams of N,N'-methylene bis-acrylamide, examination of the purified microsol in an ultracentrifuge shows only one component to be present. A calculation of the sedimentation rate shows the rate to be 5–10 times faster than a linear polymer of 100,000 molecular weight which indicates that the product is 100% microgel. The product has an $[n]$ of 0.43 and a gel point of 3.2% in water. A portion of the microsol is placed on a silica screen, dried, and shadowed with chromium. Electron micrographs of this product show the presence of discrete particles of 0.01–0.02 micron diameter.

Similar results are obtained when an equivalent amount of ethylene bis-arcrylate, divinyl benzene or ethylene bis-methacrylate is used in place of the methylene bis-acrylamide as a cross-linking agent.

*Example II*

In this example, a microgel is used to distribute a hydrogenation catalyst. In the preparation of the microgel, 55 grams of freshly distilled diethylaminoethyl methacrylate, 15 grams of n-lauryl methacrylate, 8 grams of methylene bis-acrylamide, 10 grams of sodium lauryl sulfate, 0.6 gram of potassium persulfate, 0.6 gram of sodium bisulfite and 1200 ml. of water, mixed in a 3-liter flask with stirring, are polymerized for 16 hours under a nitrogen atmosphere with stirring at 40° C. The microsol, with a gel point above 7%, contains 6.4% of microgel having a particle size (dry) of less than 3 microns.

A portion of the above product is diluted to a 3% microgel content, 100 ml. is purified by passing through the basic ion-exchange resin of Example I, 3 ml. of methyl iodide is added, and the resulting blue viscous solution of the quaternary ammonium iodide microgel is stirred overnight. This microgel is then converted to the quaternary ammonium hydroxide form by passage through the basic ion-exchange resin of Example I. The resulting product is mixed with 50 ml. of a 1% aqueous solution of palladium chloride, stirred at 50° C. for 3 hours, and then purified by dialysis, the resulting sol containing 0.81% of microgel, which microgel has an ash content (palladium oxide) of 15%. A similar microgel without a metallic coating has essentially zero ash content. The microsol is stable for at least one year.

37.7 ml. of the microsol prepared as described above and diluted to a 0.875% solids content is diluted with 37.7 ml. of absolute ethanol and mixed with 5 ml. of nitrobenzene. This mixture requires 17½ minutes for 100% reduction by means of hydrogen in a hydrogenation apparatus. As a control catalyst, 0.835 gram of palladium oxide on barium sulfate (5% palladium content) in 37.7 ml. of water and 37.7 ml. of ethanol as a medium is used for the reduction of 5 ml. of nitrobenzene under identical conditions. A total of 44 minutes is required for 100% reduction in this second case. The greater efficiency of the catalyst dispersed by means of a microgel is apparent.

A similar result is obtained in the catalytic hydrogenation of benzil. The use of a palladium oxide coated microgel permits quantitative reduction in 52 minutes, whereas the equivalent amount of palladium in a conventional form requires 99 minutes.

*Example III*

In this example, a microgel is used to distribute a germicide. In the preparation of the microgel 67 grams of freshly distilled vinyl pyrrolidone is mixed with 3 grams of N,N'-methylene bis-acrylamide and 95 ml. of water, giving a clear solution, half of which is then added to a solution of 6 grams of sodium lauryl sulfate in 600 ml. of water containing 0.3 gram of potassium persulfate and 0.2 gram of sodium bisulfite. The persulfate-containing half is polymerized at 40° C. under nitrogen for 16 hours; then the remainder of the monomer mixture is added and the polymerization is continued for a further 16 hours. A good dispersion is obtained containing 8.5% solids and having particles of approximately 0.02 micron in diameter. A stable microsol in dimethylformamide is prepared by adding dimethylformamide and removing the water under vacuum. It has a gel point of above 9%. Upon addition of iodine, the microgel particles are co-ordinated with 20% of their own weight of iodine. The product is useful as a germicide where the iodine cannot be leached out.

Example IV

This illustrates the use of a microgel as a means for distributing an organic compound useful in biological systems where it is desired to have the compound slowly available to the system and yet be in a homogeneous phase.

Salicylic acid is added in equivalent amount to the microsol of Example I (gel point 3.2%). For control purposes, a solution of triethyl ammonium-salicylate is prepared. Both solutions are placed in identical cellophane bags and dialyzed against distilled water. At intervals, samples of the dialyzate are removed and the concentration of salicylic acid determined colorimetrically as the ferric chloride complex. The results, expressed in parts per million of salicylic acid remaining in the dialysis bag, are given below:

| Dialysis Time, Hours | Salicylic Acid in Dialysis Bag (p.p.m.) | |
| --- | --- | --- |
| | Microgel-Salicylate | Control |
| 0 | 7,200 | 14,000 |
| 10 | 5,400 | 3,700 |
| 20 | 5,200 | 2,000 |
| 40 | 5,100 | 1,000 |
| 90 | 4,900 | 0 |

Example V

A microsol containing 1.5% solids is prepared as in Example I using 32 grams of dimethylaminoethyl methacrylate and 4 grams of ethylene-bis-methacrylate. It has an intrinsic viscosity of 0.37 and a gel point of 6%. A 100 ml. portion of this dispersion having a blue opalescence is treated with a stoichiometric equivalent amount of hydrochloric acid to form the monohydrochloride of the microgel and 50 ml. of an aqueous solution of a stoichiometric equivalent of silver nitrate is added. No precipitation occurs and the solution retains its original appearance. A slight amount of coagulation occurs over a period of several days which is centrifuged off, amounting to about 10% by weight of the original microgel. The remaining microsol is stable and analyses of the microgel particles show that they are 0.01–0.02 micron in diameter and coated with a silver chloride.

In a similar manner, microgels carrying 15% by weight of silver bromide are prepared.

Sufficient gelatin is added to the above microsol (microgels coated with AgCl) in the absence of light to afford a good coating when dry. The solution is spread on a cellulose acetate film and dried. Upon exposure to light, photographic development and subsequent fixing, a negative is obtained with a uniform, fine grain structure.

Example VI

The procedure for microgel formation followed in Example V is modified by the use of 8 grams of ethylene-bis-methacrylate. A microsol containing 3% of this microgel is mixed with an excess of 3% aqueous silver nitrate, heated 10 minutes over a steam bath and then allowed to stand 24 hours at room temperature under an ultraviolet light to give a slightly turbid, brownish-black product (gel point above 5%) which is dialyzed to remove the free ions. Analysis of isolated microgels shows a 9.2% content of $Ag_2O$. An electron micrograph of the microgels shows that their original 0.01–0.02 micron size is not altered by the silver oxide, although they scatter the electron beam and are visible without chromium shadowing as is required to view the original microgels themselves. This indicates that the $Ag_2O$ is associated with the particles. X-ray diffraction photographs of the dried microgels indicate that an amorphous $Ag_2O$ layer of less than .0025 micron is present. These results, in combination with the level of metal present and the calculated surface area of the particles, indicate that a monomolecular surface layer of the $Ag_2O$ is present. The microsol is stable, i.e., it does not coagulate. Stable sols of the silver oxide coated microgel in dimethylformamide are made by diluting the aqueous solution with dimethylformamide and distilling off water.

Microsols of silver oxide coated microgels are also made in methanol and acetone by evaporation of the aqueous sol to dryness in vacuo at 40° C. and subsequent redispersion in methanol or acetone.

Such "distributions" of silver oxide in liquid media are useful in themselves as antiseptic agents or as means of transferring the antiseptic agent to the desired solvent.

Further reactions are also possible on the metallic coating. Thus, upon addition of hydrazine hydrate to the microsol and warming, the color changes to yellow, indicating a reduction to metallic silver. After purification of the microsol by dialysis, the microgels are observed to be coated with 8% metallic silver.

Example VII

Microgels of a microsol prepared by the technique of Example I, but employing 128 grams of dimethylaminoethyl methacrylate and 32 grams of ethylene-bis-methacrylate as microgel forming reactants (gel point above 8%), are coated with PbO by precipitation from lead nitrate. The product is milk-like in appearance after dialysis. The passage of $H_2S$ into the microsol converts the lead oxide coating into black lead sulfide and the color of the product changes from milk-like to a brownish-black.

In a similar manner, microgels coated with lead chromate are obtained by treating the lead oxide coated microgels with potassium dichromate. The purified sol of this microgel has a red color. Such a dispersion is useful for the pigmenting or coloration of many types of products, such as paints, solutions for spinning fibers or casting films, inks, etc., where a high degree of stability is required.

Using techniques similar to the above, microgels coated with cobalt oxide (6%), mercury oxide, and cupric oxide are prepared. The cupric oxide coated microgels are reduced by hydrazine hydrate to give particles containing 3.4% metallic copper in the dispersion.

Example VIII

A mixture of 32 grams of freshly distilled acrylic acid, 2 grams of N,N'-methylene bis-acrylamide and 12 ml. of water is added to 12 grams of sodium lauryl sulfate in 1200 ml. of deaerated distilled water containing 0.1 gram of potassium persulfate and 0.05 gram of sodium bisulfite over a 30-minute period. The mixture is polymerized at 40° C. under nitrogen with stirring for 24 hours. The resultant microsol (gel point above 6%) is purified by dialysis and by repeated coagulation with sulfuric acid and further dialysis. The particles have an average particle size of about 0.02 micron. These are coated with 10% by weight of lead following the technique of Example VII.

Example IX

A suspension of blue, insoluble iron phthalocyanine in methanol is oxidized with chlorine to the soluble yellow form. The solution is precipitated in water, the product collected and dried.

A microsol prepared following the technique of Example I, using 210 grams of dimethylaminoethyl methacrylate and 26.6 grams of N,N'-methylene bis-acrylamide as microgel forming reactants, is concentrated under vacuum to a solids content of 19% (a gel point of above 7%). 5.26 grams of this microsol is mixed with 50 ml. of water and 0.037 gram of ascorbic acid in 35 ml. of water. Then a solution of 0.067 gram of the oxidized iron phthalocyanine in 10 ml. of Cellosolve is added. The ascorbic acid reduces the iron compound. The mixture is stirred at room temperature for 4 hours and dialyzed overnight through cellophane. The resulting microsol (2% solids) has a bluish-green color due to the iron phthalocyanine coating (7% by weight of the coated microgels).

The microsol decomposes hydrogen peroxide and organic peroxides so that it can be used to stop the action of these compounds at a given time in a reaction or as a test for the presence of peroxides.

Gentle vacuum drying yields a nearly transparent green solid which can be redispersed in water to give a microsol.

Similar sols, preferably containing higher concentrations of the coated microgel, are useful for pigmentation purposes.

*Example X*

A microgel is made using 53 grams of acrylonitrile and 2.31 grams of methylene bis-acrylamide following the technique of Example II. The microgels are coagulated by the addition of sodium chloride, collected in a centrifuge and washed thoroughly with water to remove all traces of salt and emulsifying agent. Unreacted organic components are washed out with a mixture of equal parts of methanol and water. A final washing is performed with pure methanol. The microgel has an intrinsic viscosity in dimethylformamide of 0.19 and a particle size (dry) of less than 0.3 micron.

A microsol with a gel point of about 10% and containing 10% of the above microgel, is made by dispersing the above microgel in dimethylformamide and removing the residual water and methanol by vacuum distillation over a steam bath. 70 ml. of a 3% aqueous solution of cupric acetate is added to an equal volume of the microsol (which has a blue opalescence) and the mixture is stirred at 60° C. thereby coagulating the microgel. 5 ml. of concentrated NH₄OH is added and, after filtering, the residue is washed with water and then dialyzed with water. The product, a light, brown-black colored microgel, is then dispersed in dimethylformamide, the water is removed by vacuum distillation and the microsol so formed centrifuged to remove the small amount of coagulated black particles present. The resulting clear, slightly yellow microsol contains 2.3% microgel (60% ash content). One gram of sodium borohydride is added to 70 ml. of the microsol and the mixture is warmed on a steam bath to yield a clear, copper red colored sol of microgel containing metallic copper. The addition of H₂S, which causes no precipitation, changes the color to gray and yields a microsol wherein the microgel particles are coated with copper sulfide.

In a similar manner, a clear, grayish yellow sol of a microgel containing 30% (based on microgel) of metallic silver is obtained using AgNO₃ in place of copper acetate.

In the process of the present invention, the chemical entity is associated with a microgel to which it is the complement. Thus, acidic or basic microgels may be employed to react by simple metathesis with a basic or acidic chemical entity to form a salt, which, if insoluble in the extending medium of the microsol, will be deposited upon the microgel. Alternatively, the microgel and chemical entity may be combined by formation of a coordinated complex due to the complementary nature of their structures. Further chemical reaction, such as oxidation, reduction or the like, may thereafter be accomplished upon the resulting salt or complex conventional chemical operations. Thus, microgels, which can be made by addition or condensation polymerization reactions, made up from at least about 10% by weight of monomeric units containing a radical which in the polymeric form is a member of the class consisting of

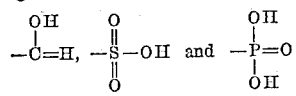

can be used to complement acids; a radical from the class consisting of

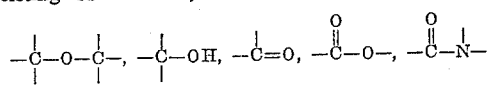

is complementary to bases; and a radical from the class consisting of —C≡N,

and

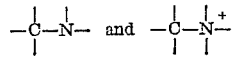

are useful for forming coordinated complexes (each of the residual valences in the radicals listed being satisfied by carbon or hydrogen).

The monomers to be used in the preparation of the microgel will be selected in view of the substance to be placed on the microgel. Metals that are located in the middle of the extended form of the periodic table (e.g., V to Ge inclusive, Tc to Sb inclusive and Re to Po inclusive) are preferred for coating a microgel via a coordination compound formation. Thus, V, Cr, Mn, Fe, Co, Ni, Cu, Zn, Ge, Ru, Rh, Pd, Ag, Cd, Os, Ir, Pt, Au and Hg form complexes in which nitrogen is the donor atom. V, Cr, Fe, Ga, Te, In, Sn, Sb, Re, Tl, Pb and Bi form complexes in which oxygen is the donor atom. Such complexes are discussed in "Chemistry of the Coordination Compounds," by J. Bailar, published by the Reinhold Publishing Corporation of New York in 1956.

Atomic groups which can hold metals by salt formation in addition to the formation of coordination compounds as the amino, quaternary ammonium, carboxyl, sulfonic and phosphonic are preferred for use in the invention. Such groups are present in what is referred to hereinafter as a polyelectrolyte microgel, i.e., a polymer having acid or basic groups on 10% to 90% of the monomeric units present in the polymer.

Monomers suitable as a component for making non-polyelectrolyte microgels include: vinyl ethers, methyl vinyl ketone, methyl isopropenyl ketone, amides and esters of acrylic and methacrylic acids as acrylamide, methacrylamide, methyl methacrylate, methyl acrylate and the like, acrylonitrile, methacrylonitrile, N-vinyl pyrrolidone, vinyl carboxylates and others having the oxygen or nitrogen groupings discussed above.

The polyelectrolyte microgels for use in this invention may be made by addition or condensation polymerization reactions. A difunctionally polymerizable monomer containing acid or basic groups or precursors thereof and a trifunctionally (or higher) polymerizable monomer may be used. The first named monomer confers a lyophilic character to the microgel so that it will swell in the disperse medium. The second monomer causes cross-linking and the formation of microgel to prevent complete solubility in the disperse medium.

Suitable difunctional monomers may be found in all classes of addition-type monomers containing acidic or basic groups. Monomers having carboxylic groups as: acrylic acid, alpha-chloroacrylic acid, methacrylic acid, itaconic acid, fumaric acid, maleic acid, citraconic acid, crotonic acid, vinyl benzoic acd, and the lke may be used. Monomers bearing other acid groups as sulfonic or phosphonic acids may also be used, such as: 1-propene-2-phosphonic acid, styrene sulfonic acid, methallyl sulfonic acid, allyl sulfonic acid, ethylene sulfonic acid, and others as disclosed in U.S. Patents 2,601,256 and 2,527,300.

Those addition-type monomers bearing primary, secondary or tertiary amine groups are well suited for use in this invention. Such monomers include: 2-vinyl pyridine, 2-methyl-5-vinyl pyridine, and others of that type as disclosed in U.S. Patent 2,491,471, issued to Arnold, p-dimethylaminomethyl styrene (see U.S. Patent 2,691,640), vinyl ethers of amino alcohols such as beta-diethyl aminoethyl vinyl ether, esters of acrylic and methacrylic acid with amino alcohols such as N,N-diethyl aminoethyl acrylate and polymerizable quaternary ammonium compounds, such as allyl triethyl ammonium chloride, vinyl pyridinium chloride, allyl pyridinium bromide, methallyl pyridinium chloride and others as disclosed in Price U.S. Patent 2,723,238, betavinyloxyethyl dicarbomethoxyethyl methylammonium chloride and others as disclosed in Albisitti and Barney U.S. Patent 2,729,622 and others.

Although the basic or acidic groups present in the microgel preferably arise from the monomers used, it will be obvious to those skilled in the art that such groups can arise from the after-treatment of the microgel, as for example, the reduction-amination of microgel containing ketone groups made from such monomers as methyl vinyl ketone, isopropenyl methyl ketone and the like (by a process such as disclosed in Hamm U.S. Patent 2,740,763), or by the quaternization of a nitrogen group in a dispersion of a microgel (by a process such as shown in Hamm U.S. Patent 2,676,952), or by exposure of a microgel containing a methallyl haloacetate to quaternization conditions (by a process such as disclosed in Hamm U.S. Patent 2,656,326).

It will be understood that one or more additional difunctional neutral monomers may be used in conjunction with a monomer bearing acidic or basic groups. This is particularly useful when it is desired to modify the nature of the resulting microgel, since the microgel will be more sensitive (i.e., swell more) to those liquids which are solvents for the homopolymer of such a monomer. Thus, such monomers as acrylonitrile, vinyl chloride, vinylidine chloride, various esters of acrylic and methacrylic acids, acrylamide, methacrylamide, styrene, and the like may be used to modify the microgel properties.

Appropriate cross-linking agents are chosen in accordance with conventional practice in the production of cross-linked polymers. Compounds useful in this function include those which contains two or more times the vinyl or acrylic grouping (i.e., having a functionality of 3 or more) as, for instance, divinyl benzene, diallyl cyanamide, ethylene diacrylate, methylene diacrylamide, ethylene glycol divinyl ether, triethylene dimethacrylate, vinyl acrylate, benzene diallyl phosphonate and glycerol trivinyl ether. It will be obvious that the cross-linking agent can also carry acidic or basic groups, as, for example, divinyl benzene sulfonic acid.

In general, the microgels of this invention will contain from 1 to 60 mol percent of a cross-linking agent. The exact amount will depend upon the gel point that is desired. For example, the inclusion of 6.4 and 25.2 mol percent of a divinyl compound affords microgels having gel points of 3.2 and 38%, respectively, in water.

The emulsion polymerization techniques to be used in the preparation of microgels of this invention are similar to those well known in the art, as, for example, discussed in "Emulsion Polymerization," by Kolthof and Bovey, published by Interscience Publishers, Inc., of New York, in 1955, with the notable difference that much more dilute dispersion of the monomer is used for the preparation of these microgels. The monomer should constitute from 2 to 50% of the total polymerization mixture and preferably from 5 to 30%. Many types of dispersing agents in addition to the sodium lauryl sulfate employed in the examples are satisfactory in the production of the microgels and the type and amount will be obvious to those skilled in the art.

Similarly, any manner of initiating the polymerization can be used, and in addition to persulfates, such initiators as peroxides (diacyl or diaryl), hydrogen peroxide, organic azo compounds as, for example, disclosed in U.S. Patent 2,471,959, and other initiators can be used. The use of redox systems is particularly advantageous in the polymerization.

The microgels are preferably purified from unreacted monomers, dispersing agent, etc., by washing or dialysis before coating, but the crude microgels can be used.

Microgels useful in accordance with the present invention may also be formed by condensation. In such processes, they are preferably produced by a modified emulsion technique. In this process, each reactant is dissolved in a different solvent, the solvents being of such character that they are immiscible, i.e., one may be polar and the other nonpolar. The solvents must be liquid at reaction temperature. An emulsion of the incompatible solvents is formed, preferably in the presence of a dispersing agent. On addition of the continuous phase reactant (i.e., the reactant soluble in the continuous phase) and the discontinuous phase reactant to the emulsion of incompatible solvents (referred to hereinafter as a reactant contact medium), polymerization by condensation occurs at the emulsion interface. The product may thereafter form a microsol in one phase or the other or alternately being non-swellable in either phase, precipitate out or form a dispersion as microgel. The cross-linking agent may be incorporated in either or both phases. A stabilizing agent is advantageously employed in either or both phases where formation of the polymer occurs as a minute dispersion and precipitation is not desired. A condensing agent to remove products formed during reaction may also be present to assist polymer formation.

Amine groups may be present in condensation polymers (such as polyamides, polysulfonamides, polyurethanes and polyureas) as chain end groups derived from an excess of the diamine used in the polymerization.

Tertiary amine end groups are useful in this invention and may be obtained by the use of viscosity stabilizers in the polymerization, as, for example, N-aminoalkylmorpholines and the like.

Amine groups may be present in the condensation polymer chain. Such mid-chain groups can be obtained from the use of a dicarboxylic acid halide containing one or more tertiary amine groups, such as piperazine diacetic acid halide, N-methylimino diacetic acid halide and others, the acids of which are discussed in U.S. Patent 2,274,831, issued to Hill in 1942. A monomer containing two primary or secondary amino groups that are amide forming and one or more tertiary amine groups can also be used, as, for example, N,N'-bis(aminopentyl)piperazine.

Acid groups can be introduced in condensation polymers as end groups by using an excess of dibasic acid halide. Acid groups can also be used as mid-chain groups by the use of a compound containing two acid halide groups and one acid group. The difference in the reactivity between the acid halide and the free acid is so great that the free acid would not take place in the reaction. Other methods will be obvious as the reaction of pyromellitic dianhydride with a diamine to give linear polyamides with free carboxyl groups.

Cross-linking agents for use in making condensation polymer microgels of this invention will be found among all classes of tri- or higher functional condensation monomers, such as triethylene tetramine, 2,5,8-tris-(aminomethyl)nonane, tartaric acid halide and pyromellitic acid halide.

In preparing the dispersions of solid materials with the aid of microgels, i.e., coating the microgels, the concentration of the microgel in the microsol must be below the gel point. A concentration of microgel that is 1 to 50% of the gel point concentration should be used. The range of 5 to 30% of the gel point concentration is preferred.

Water is conveniently used as the disperse medium of the microsol. Other liquids can be used as dimethylformamide, methanol, acetone and the like if they are desirable for the particular compound to be placed on the microgel surface or depending on the end use of the microsol.

The compound to be placed directly on the microgel or that is used as an intermediate for the coating is preferably used in amounts slightly in excess of the equivalent weight of the microgel. The equivalent weights of the microgel are readily determined by potentiometric titrations with a standard acid or base (depending on the type of microgel) in the presence of an electrolyte such as sodium chloride or lanthanum nitrate. The equivalent weights of soap-free microgels can be approximated from the ratios of the monomers fed to the polymerization.

The reaction between the compound and the microgel can be run at any desired temperature at which the system is stable.

The reaction mixture is stirred under gentle conditions.

Although the reaction mixture containing coated microgel, excess reagent and by-products can be used as is, purification is usually preferred. Dialysis in a proper membrane against the pure liquid used as the disperse phase is a preferred method of purification following a preliminary filtration or centrifugation.

The coated microgels are preferably used as the microsol in which they were prepared. The disperse medium can, of course, be changed without precipitating or coagulating the microgels. The coated microgels can also be removed from the microsol preferably by gentle drying methods, as, for example, by freeze drying or vacuum evaporation at moderate temperatures. The dried microgels can be handled as solids and redispersed to make a stable sol at will.

The processes and products of this invention are of great advantage in that they offer a simple, economical way of placing heretofore insoluble materials in a stable dispersion or "distribution" in any desired liquid. Thus, a metal like silver, copper, palladium, platinum, etc., can be given properties that make it appear to be virtually dissolved in an organic liquid. Orangic compounds as, for example, drugs like penicillin or aspirin, can be coated on microgels and distributions made that have the advantage of releasing the drugs only as they are used. Such microsols can be mixed with other liquids as paint, spinning solutions, etc., or can be used for casting films if the microgel concentration is near the gel point.

Many equivalent modifications will be apparent to those skilled in the art from a reading of the above without a departure from the inventive concept.

I claim:

A process for forming a stable distribution of a silver halide in water which comprises contacting, in water, (I) a particle of the acid halide salt of dimethylaminoethyl methacrylate cross-linked with ethylene-bis-methacrylate, said particle being composed of a single molecule, having an average diameter in its unswollen state of no greater than about 3 microns and being present in said water at a concentration of no greater than about 6% by weight with (II) a stoichiometric equivalent of silver nitrate in aqueous solution.

References Cited in the file of this patent

UNITED STATES PATENTS

| | | |
|---|---|---|
| 2,562,140 | Dafter | July 24, 1951 |
| 2,600,122 | Meyer et al. | June 10, 1952 |
| 2,628,203 | Gilder et al. | Feb. 10, 1953 |
| 2,908,659 | Shashoua | Oct. 13, 1959 |